(12) United States Patent
Williams et al.

(10) Patent No.: US 9,046,039 B2
(45) Date of Patent: Jun. 2, 2015

(54) STAGED PILOTS IN PURE AIRBLAST INJECTORS FOR GAS TURBINE ENGINES

(75) Inventors: Brandon Phillip Williams, Urbandale, IA (US); Viraphand Cholvibul, Urbandale, IA (US); David H. Bretz, West Des Moines, IA (US)

(73) Assignee: Rolls-Royce plc (GB)

( * ) Notice: Subject to any disclaimer, the term of this patent is extended or adjusted under 35 U.S.C. 154(b) by 875 days.

(21) Appl. No.: 13/292,258

(22) Filed: Nov. 9, 2011

(65) Prior Publication Data

US 2012/0047903 A1 Mar. 1, 2012

Related U.S. Application Data

(63) Continuation-in-part of application No. 12/115,579, filed on May 6, 2008, now Pat. No. 8,096,135, and a continuation-in-part of application No. 12/562,398, filed on Sep. 18, 2009, now Pat. No. 8,607,571.

(51) Int. Cl.
*F23R 3/14* (2006.01)
*F23R 3/28* (2006.01)
(Continued)

(52) U.S. Cl.
CPC . *F02C 7/222* (2013.01); *F02C 7/22* (2013.01); *F02C 7/228* (2013.01); *F02C 9/34* (2013.01); *F23D 11/107* (2013.01); *F23D 2900/00015* (2013.01); *F23D 2900/11101* (2013.01); *F23R 3/14* (2013.01); *F23R 3/286* (2013.01); *F23R 3/343* (2013.01); *Y02T 50/675* (2013.01)

(58) Field of Classification Search
CPC ............ F23R 3/14; F23R 3/286; F23R 3/343;
F02C 7/22; F02C 7/222; F02C 7/228; F02C 9/34; F23D 11/107; F23D 2900/00015; F23D 2900/11101; Y02T 50/675
USPC .......................................... 60/740, 742, 748
See application file for complete search history.

(56) References Cited

U.S. PATENT DOCUMENTS

| | | | |
|---|---|---|---|
| 1,875,457 | A | 9/1932 | Hemmingsen |
| 2,703,260 | A | 3/1955 | Olson et al. |

(Continued)

FOREIGN PATENT DOCUMENTS

| | | |
|---|---|---|
| EP | 1445538 A1 | 8/2004 |
| EP | 1750056 A2 | 2/2007 |

(Continued)

OTHER PUBLICATIONS

Arthur H. Lefebvre, Atomization and Sprays, chapter 6, Hemisphere Publishing Corporation, New York, Washington, Philadelphia, London, 1989, pp. 201-272.

(Continued)

*Primary Examiner* — William H Rodriguez
*Assistant Examiner* — Carlos A Rivera
(74) *Attorney, Agent, or Firm* — Barnes & Thornburg LLP

(57) ABSTRACT

An injector includes a main nozzle body defining a central axis and having a main fuel circuit. A pilot nozzle body is mounted inboard of the main nozzle body. The pilot nozzle body includes a pilot air circuit on the central axis with fuel circuitry radially outboard of the pilot air circuit for delivering fuel to a fuel outlet in a downstream portion of the pilot nozzle body. The fuel circuitry includes a primary pilot fuel circuit configured and adapted to deliver fuel to the fuel outlet and a secondary pilot fuel circuit configured and adapted to deliver fuel to the same fuel outlet.

20 Claims, 6 Drawing Sheets

(51) Int. Cl.
*F23R 3/34* (2006.01)
*F02C 9/34* (2006.01)
*F02C 7/22* (2006.01)
*F02C 7/228* (2006.01)
*F23D 11/10* (2006.01)

(56) References Cited

U.S. PATENT DOCUMENTS

| | | | |
|---|---|---|---|
| 3,899,884 A | 8/1975 | Ekstedt | |
| 3,980,233 A | 9/1976 | Simmons et al. | |
| 4,139,157 A | 2/1979 | Simmons | |
| 4,562,698 A | 1/1986 | Halvorsen et al. | |
| 4,600,151 A | 7/1986 | Bradley | |
| 5,016,443 A | 5/1991 | Shimizu et al. | |
| 5,224,333 A | 7/1993 | Bretz et al. | |
| 5,570,580 A | 11/1996 | Mains | |
| 5,799,872 A * | 9/1998 | Nesbitt et al. | 239/8 |
| 6,272,840 B1 | 8/2001 | Crocker et al. | |
| 6,389,815 B1 | 5/2002 | Hura et al. | |
| 6,523,350 B1 * | 2/2003 | Mancini et al. | 60/740 |
| 6,547,163 B1 | 4/2003 | Mansour et al. | |
| 6,622,488 B2 * | 9/2003 | Mansour et al. | 60/740 |
| 6,672,066 B2 | 1/2004 | Wrubel et al. | |
| 6,688,534 B2 * | 2/2004 | Bretz | 239/8 |
| 6,718,770 B2 | 4/2004 | Laing et al. | |
| 6,755,024 B1 | 6/2004 | Mao et al. | |
| 7,506,510 B2 * | 3/2009 | Thomson | 60/740 |
| 7,779,636 B2 | 8/2010 | Buelow et al. | |
| 8,096,135 B2 * | 1/2012 | Caples | 60/776 |
| 8,607,571 B2 * | 12/2013 | Williams et al. | 60/740 |
| 2003/0221429 A1 | 12/2003 | Laing et al. | |
| 2004/0148937 A1 | 8/2004 | Mancini | |
| 2004/0148938 A1 | 8/2004 | Mancini et al. | |
| 2004/0148939 A1 | 8/2004 | Young | |
| 2005/0039456 A1 * | 2/2005 | Hayashi | 60/737 |
| 2006/0248898 A1 | 11/2006 | Buelow et al. | |
| 2007/0137207 A1 * | 6/2007 | Mancini et al. | 60/737 |
| 2007/0163263 A1 | 7/2007 | Thomson | |
| 2008/0066720 A1 * | 3/2008 | Piper et al. | 123/470 |
| 2009/0077973 A1 | 3/2009 | Hu et al. | |
| 2009/0277176 A1 | 11/2009 | Caples | |
| 2010/0263382 A1 * | 10/2010 | Mancini et al. | 60/742 |
| 2010/0287946 A1 | 11/2010 | Buelow et al. | |
| 2011/0067403 A1 | 3/2011 | Williams et al. | |

FOREIGN PATENT DOCUMENTS

| | | |
|---|---|---|
| EP | 2241816 A2 | 10/2010 |
| GB | 1549957 A | 8/1979 |
| GB | 2374406 A | 10/2002 |
| GB | 2404976 A | 2/2005 |
| GB | 2451517 A | 2/2009 |
| JP | 2010249504 A | 11/2010 |

OTHER PUBLICATIONS

Arthur H. Lefebvre, Gas Turbine Combustion, Chapter 10, Hemisphere Publishing Corporation, Washington, New York, London, 1983, pp. 371-461.
UK Search Report dated May 23, 2007 for GB0700228.0.
UK Search Report dated Apr. 14, 2008 for GB0801660.2.
UK Search Report dated Apr. 2011 for GB1015302.1.
UK Combined Search Report and Examination Report dated Nov. 26, 2010 for GB1015302 1.
Examination Report dated Nov. 28, 2011 issued in the corresponding United Kingdom Patent Application No. GB0907678.7.

* cited by examiner

STAGED PILOTS IN PURE AIRBLAST INJECTORS FOR GAS TURBINE ENGINES

CROSS-REFERENCE TO RELATED APPLICATIONS

This application is a continuation-in-part of U.S. patent application Ser. No. 12/115,579 filed May 6, 2008. This application is also a continuation-in-part of U.S. patent application Ser. No. 12/562,398 filed Sep. 18, 2009. Each of the two above-referenced applications is incorporated by reference herein in its entirety.

BACKGROUND OF THE INVENTION

1. Field of the Invention

The present invention relates to injectors and atomizers, and more particularly to staged pilot fuel injectors for gas turbine engines.

2. Description of Related Art

A variety of devices and methods are known in the art for injecting fuel into gas turbine engines. Of such devices, many are directed to injecting fuel into combustors of gas turbine engines while reducing undesirable emissions. With the increased regulation of emissions from gas turbine engines have come a number of concepts for reducing pollutant emissions while improving the efficiency and operability of the engines.

Modern gas turbine engine designs include providing high temperature combustion temperatures for thermal efficiency throughout a range of engine operating conditions. High temperature combustion minimizes emissions of some undesired gaseous combustion products, such as carbon monoxide (CO) and unburned hydrocarbons (UHC), and particulates, among other things. However, high temperature combustion also tends to increase the production of nitrogen oxides ($NO_X$). Thus measures must be taken to provide thermally efficient operation within a temperature range that minimizes $NO_X$, CO, and UHC.

One method often used to reduce unwanted emissions is staged fuel injection, wherein the combustion process is divided into two (or more) zones or stages, which are generally separated from each other by a physical distance, but still allowed some measure of interaction. Each stage is designed to provide a certain range of operability, while maintaining control over the levels of pollutant formation. For low power operation, only the pilot stage is active. For higher power conditions, both the pilot and the main stages may be active. In this way, proper fuel-to-air ratios can be controlled for efficient combustion, reduced emissions, and good stability. The staging can be accomplished by axial or radial separation. Staged fuel injectors for gas turbine engines are well known in the art.

It is difficult to provide thermally efficient, low emissions operation over the widening range of conditions in gas turbine engine designs. Additionally, during low power operating conditions, conventional staged fuel injectors only have fuel flowing through one of the staged fuel circuits. Measures must be taken to control temperatures in the stagnant fuel circuit to prevent coking within the injector. In the past, attempts were made to extend injector life by passively insulating, actively cooling, or otherwise protecting the fuel circuitry of fuel injectors from carbon formation during low power engine operation.

Along with staged combustion, pollutant emissions can be reduced by providing a more thoroughly mixed fuel-air mixture prior to combustion wherein the fuel-to-air ratio is below the stoichiometric level so that the combustion occurs at lean conditions. Lean burning results in lower flame temperatures than would occur with stoichiometric burning. Since the production of $NO_X$ is a strong function of temperature, a reduced flame temperature results in lower levels of $NO_X$. The technology of directly injecting liquid fuel into the combustion chamber and enabling rapid mixing with air at lean fuel-to-air ratios is called lean direct injection (LDI).

U.S. Pat. No. 6,389,815 to Hura et al. describes a lean direct injection system, which utilizes radially-staged combustion within a single injector. The pilot fuel delivery is of the "swirl-cup" type shown in U.S. Pat. No. 3,899,884 to Ekstedt, wherein a pressure swirl atomizer sprays liquid fuel onto a filming surface where the liquid film is stripped off into droplets by the action of compressor discharge air. The main fuel delivery system utilizes a series of discrete atomizers that spray radially outward into a swirling cross-flow of air. The main fuel delivery is staged radially outboard of the pilot, and operates in the fuel-lean mode. Separation of the pilot combustion zone from the main combustion zone is achieved by radial separation as well as an air jet located radially between the two combustion zones.

U.S. Pat. No. 6,272,840 to Crocker et al. discloses a lean direct injection system, which also utilizes radially-staged combustion within a single injector. The pilot fuel delivery is of either a simplex air-blast type, or a prefilming air-blast type, and the main fuel delivery system is of a prefilming air-blast type. The radial staging of the pilot and main combustion zones is achieved by ensuring that the pilot combustion zone remains on-axis with no central recirculation zone.

U.K. Patent Application No. GB 2 451 517 to Shui-Chi et al. describes a pilot circuit divided into a primary and secondary fuel split. The primary circuit includes a pressure atomizer (simplex) on the centerline that is used for low power operation. The secondary pilot circuit is radially outboard of the primary circuit and is in the form of circumferentially spaced ports aimed towards the centerline. These circumferentially spaced ports are prone to external and internal carbon concerns.

Pure airblast nozzles are in wide use among engine manufacturers, particularly in aircraft engines. Pure airblast nozzles create favorable air/fuel mixtures and have spray characteristics that produce combustion qualities desirable for low emissions and high engine efficiencies. A typical pure airblast injector has one fuel circuit. Fuel can be directed from an injector inlet fitting to a fuel swirler through a fuel tube. At the fuel swirler, the fuel can be split into a multitude of discrete paths, all of which discharge into the combustor. These discrete paths are all fluidly connected and are thus all part of a single fuel circuit.

One example of a pure airblast fuel injector is described in U.S. Pat. No. 6,622,488 to Mansour, et al., which shows a fuel injector having a pure airblast nozzle connected to a housing stem. The fuel nozzle includes a fuel swirler that has a plenum for receiving fuel from a conduit in the housing stem. A plurality of fuel passages conduct fuel from the plenum to discharge orifices. The downstream ends of the passages are angled so as to impart swirl on fuel exiting therethrough. A prefilmer surrounds the fuel swirler. Fuel exiting the swirler is directed inwardly by the prefilmer. An inner air passage extends through the center of the fuel swirler and an outer air passage is defined outboard of the prefilmer. The inner and outer air passages include air swirlers for imparting swirl to compressor discharge air flowing therethrough. As fuel exits the swirler/prefilmer, it is sheared between the swirling air flows issuing from the inner and outer air passages to atomize the fuel for combustion.

While pure airblast nozzles can provide for clean fuel combustion when the engine compressor is spooled up, difficulties can arise during engine startup. Pure airblast nozzles depend on fast moving air to break up the slower moving fuel spray into fine droplets. As described above, the airblast typically comes from compressor discharge air routed through the nozzle. However, during engine startup the compressor is not fully spooled up and thus the air pressures provided to the nozzle during engine startup are not always high enough to provide the necessary atomizing air blast. Therefore, the amount of fuel atomized can be insufficient to initiate or sustain ignition. Thus it can be quite difficult to start an engine using only traditional pure air blast nozzles.

Another problem during startup for traditional airblast nozzles is that when the startup air pressure is too low to fully atomize the fuel flowing from the nozzle, significant amounts of fuel can issue from the nozzle without being atomized. Liquid fuel drooling from the nozzle constitutes waste of fuel and can cause poor emissions as well as complications that can arise from fuel pooling in undesirable locations of the engine. Pooled fuel can ignite explosively and emit a plume of white smoke out of the exhaust.

Some solutions to these problems have been suggested, such as including auxiliary start nozzles, for example liquid-pressure atomizing nozzles, dedicated for use during start up. It is also known to use hybrid nozzles, which include air blast fuel nozzles for full power operation in addition to liquid-pressure atomizing nozzles for use during startup. Piloted airblast nozzles are sometimes used to achieve the needed starting characteristics while trying to match pure airblast nozzle performance. However, piloted airblast nozzles tend to lack the superior thermal management inherent in pure airblast nozzles. Piloted airblast nozzles also fail to achieve identical spray characteristics with pure airblast nozzles because the pressure atomizing circuit mixes with the airblast spray.

Other solutions include adding auxiliary air pumps or compressors to generate atomizing air blasts through pure airblast nozzles during engine start up. However, while these solutions can be used to facilitate engine start up, they can also add significantly to the cost and weight of the engine.

Such conventional methods and systems have generally been considered satisfactory for their intended purpose. However, there is still a need in the art for staged pilot injectors that allow for improved staging pressure ratios for lean direct injection. There also remains a need in the art for improved airblast injectors with improved fuel distribution at low power levels, such as for improved startup. The present invention provides a solution for these problems.

SUMMARY OF THE INVENTION

The subject invention is directed to a new and useful fuel injector for a gas turbine engine. The injector includes a main nozzle body defining a central axis and having a main fuel circuit. A pilot nozzle body is mounted inboard of the main nozzle body. The pilot nozzle body includes a pilot air circuit on the central axis with fuel circuitry radially outboard of the pilot air circuit for delivering fuel to a fuel outlet in a downstream portion of the pilot nozzle body. The fuel circuitry includes a primary pilot fuel circuit configured and adapted to deliver fuel to the fuel outlet and a secondary pilot fuel circuit configured and adapted to deliver fuel to the same fuel outlet.

In certain embodiments, the primary pilot fuel circuit includes a plurality of first fuel passages and the secondary pilot fuel circuit includes a plurality of second fuel passages. The first and second fuel passages extend from an upstream portion of the pilot nozzle body to the fuel outlet thereof. The first and second fuel passages can feed into a common prefilming chamber defined in the downstream portion of the pilot nozzle body upstream of the fuel outlet. The first and second fuel passages can be in fluid communication with the prefilming chamber by way of a plurality of metering slots.

The number and/or configuration of metering slots of the first fuel passages can be different from the number and/or configuration of metering slots of the second fuel passages. For example, each of the first fuel passages can be in fluid communication with the prefilming chamber through one metering slot, and each of the second fuel passages is in fluid communication with the prefilming chamber through two metering slots. Each metering slot of the first fuel passages can, for example, be angled at a first angle with respect to a central axis of the nozzle body for imparting swirl onto fuel flowing therethrough, and each metering slot of the second fuel passages can be angled at a second angle with respect to a central axis that is different from the first angle. It is also contemplated that each metering slot of the first fuel passages can have a first flow area, and each metering slot of the second fuel passages can have a second flow area that is different from the first flow area. In another example, each metering slot of the first fuel passages can have a first depth relative to the central axis, and each metering slot of the second fuel passages can have a second depth relative to the central axis that is different from the first depth.

The pilot nozzle body can include a fuel swirler outboard of the pilot air circuit and a prefilmer mounted outboard of the fuel swirler. The first and second fuel passages can be defined in an outboard surface of the fuel swirler. Each of the first fuel passages can include a first fuel inlet in fluid communication with a first opening through the prefilmer. Each of the first fuel passages can include a metering slot in fluid communication with the fuel outlet of the pilot nozzle body. Each of the second fuel passages can extend between the outlet of the pilot nozzle body and a common fuel inlet in fluid communication with a second opening through the prefilmer. One of the second fuel passages can extend between each circumferentially adjacent pair of first fuel passages. The primary pilot fuel circuit can be configured and adapted to have a lower flow number than the secondary pilot fuel circuit. It is also contemplated that at least one of the main fuel circuit and pilot fuel circuits can include a diverging prefilming air-blast atomizer.

The invention also provides a fuel injector for a gas turbine engine for fuel patternation control by varying relative flow in the first and second fuel circuits. The injector includes a nozzle body having an air circuit on the central axis with fuel circuitry radially outboard of the air circuit for delivering fuel to a prefilming chamber outboard of the air circuit. The fuel circuitry includes a first fuel circuit configured and adapted to deliver a fuel flow into the prefilming chamber with a first set of flow characteristics, and a second fuel circuit configured and adapted to deliver a fuel flow into the prefilming chamber with a second set of flow characteristics that is different from the first set of flow characteristics for fuel patternation control by varying relative flow in the first and second fuel circuits.

The invention also provides a fuel injector with main, primary pilot, and secondary pilot fuel circuits. The injector includes a main nozzle body defining a central axis and having a main fuel circuit. A pilot nozzle body is mounted inboard of the main nozzle body. The pilot nozzle body includes a pilot air circuit on the central axis with fuel circuitry, including the primary and secondary pilot fuel circuits, radially outboard of the pilot air circuit as described above.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
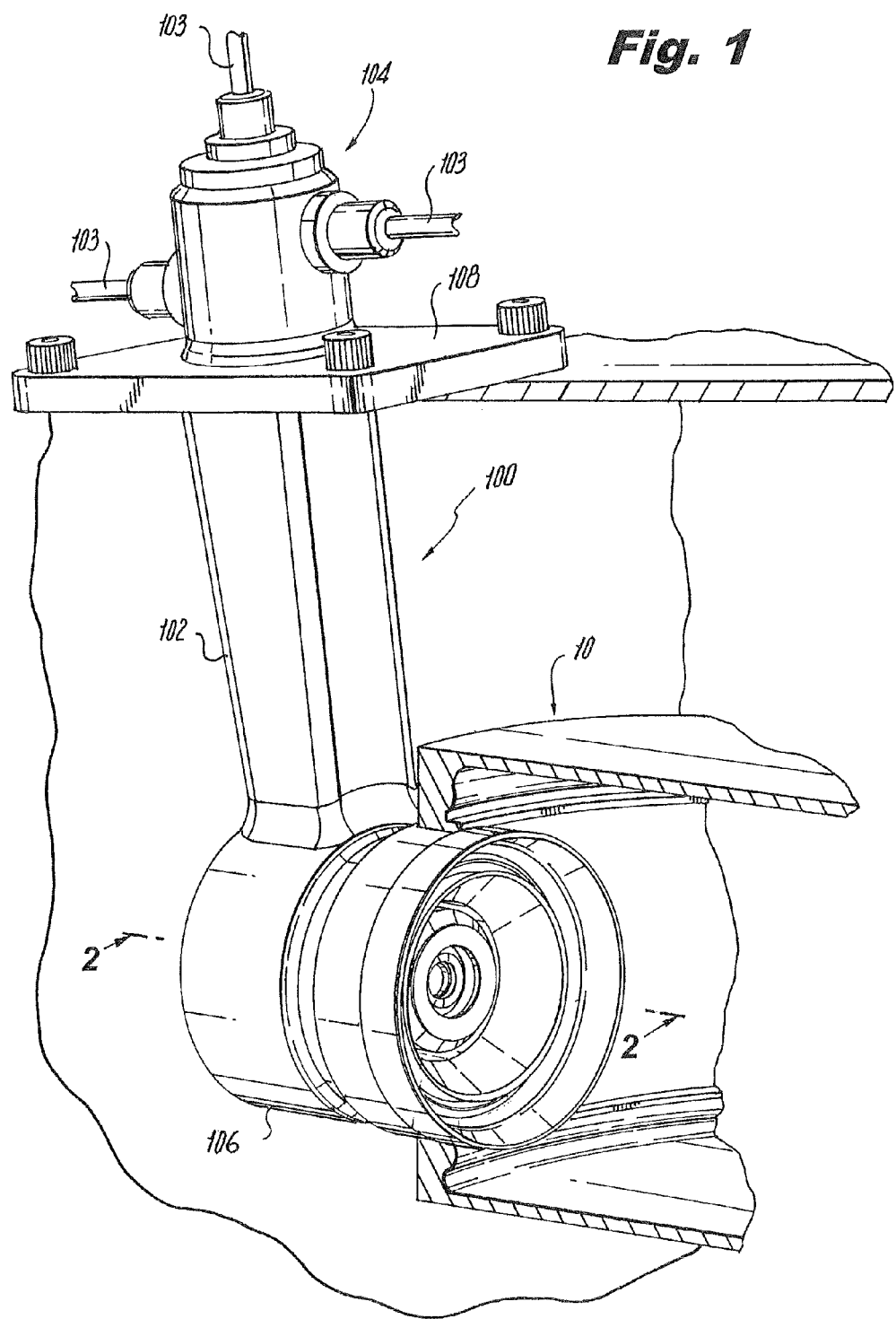
FIG. 1 is a perspective view of an exemplary embodiment of an injector constructed in accordance with the present invention, showing portions of the housing and combustor of a gas turbine engine with the injector in place.

Reference will now be made to the drawings wherein like reference numerals identify similar structural features or aspects of the subject invention. For purposes of explanation and illustration, and not limitation, a partial view of an exemplary embodiment of an injector constructed in accordance with the invention is shown in FIG. 1 and is designated generally by reference character 100. Other embodiments of injectors in accordance with the invention, or aspects thereof, are provided in FIGS. 2-9, as will be described. The systems of the invention can be used to improve staging pressure ratios for lean direct injection, and to enhance fuel distribution at low power levels for improved startup.

U.S. Patent Application Publication No. 2006/0248898, which is incorporated herein by reference in its entirety, describes lean direct injection atomizers for gas turbine engines. The present invention pertains to fuel injectors that deliver a fuel/air mixture into the combustion chamber of a gas turbine engine. In particular, the invention pertains to fuel injectors for staged, lean direct injection (LDI) combustion systems, wherein around 50% to 80% of the combustion air enters the combustion chamber through the fuel injector, for example. Such a system is designed to reduce pollutant emissions, particularly nitrogen oxides ($NO_x$), carbon monoxide (CO), and unburned hydrocarbons (UHC).

There is a strong desire to operate in a pilot, only mode for a substantial portion of the operating thrust, such as up to 50%-70% power or more. However, due to the desire to have good atomization for the entire range of operation which generates a high turndown ratio, the size of the pilot metering capacity is dictated by exterior constraints such as pump capability, manifold pressure limits and cooling requirements. The present invention allows for staging of the pilot zone into subcomponents in order to increase the operating thrust in pilot only modes without exceeding desirable pressure limits. The pilot is separated into primary and secondary pilot fuel circuits, and these can take various forms as described below.

Figure 2:
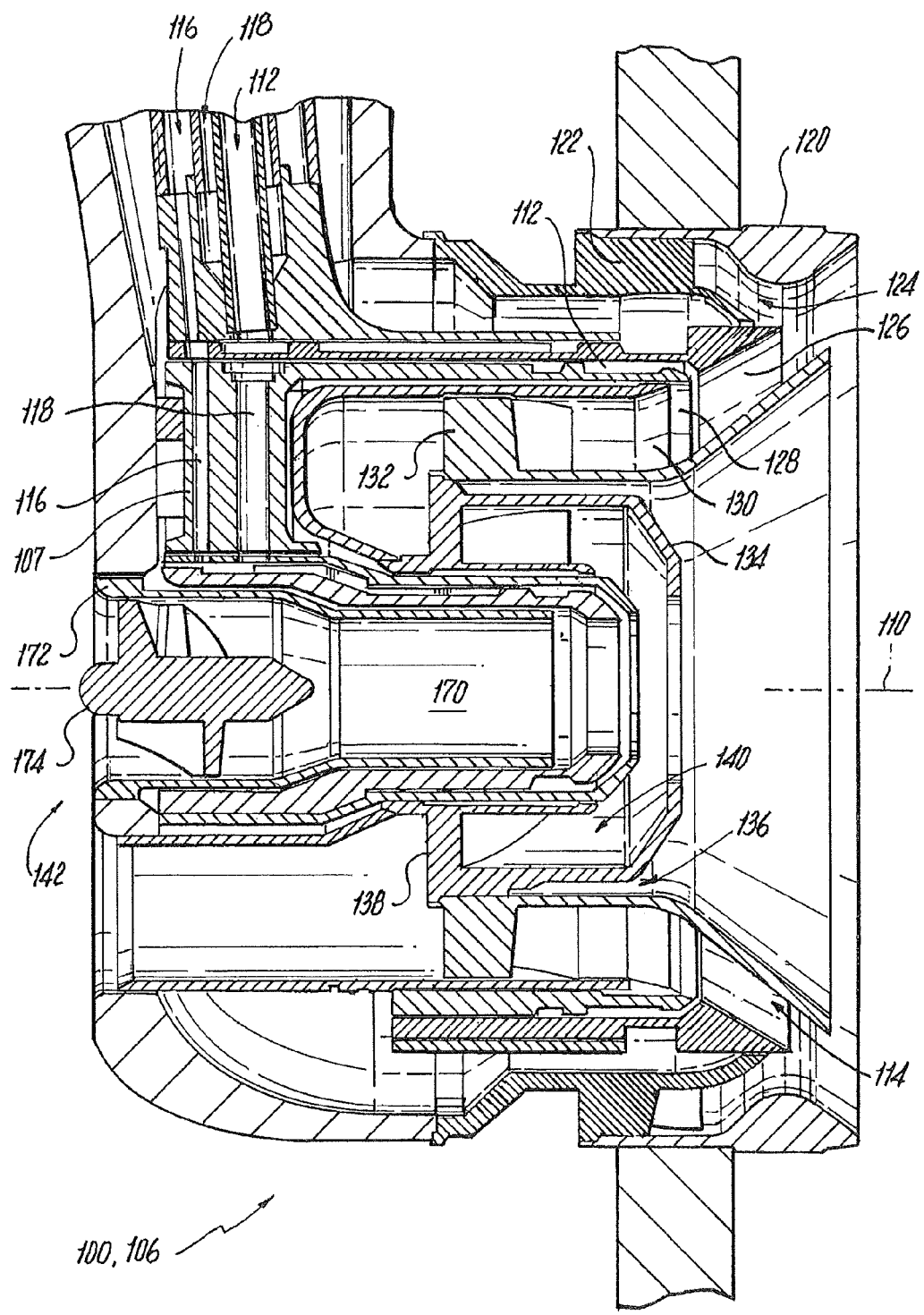
FIG. 2 is a cross-sectional side elevation view of a portion of the injector of FIG. 1, showing portions of the main, primary pilot, and secondary pilot fuel circuits.

As shown in FIG. 1, a fuel injector 100 for a gas turbine engine is shown mounted in a combustor 10, which is shown partially cut away. Fuel injector 100 includes an elongated feed arm 102 having an inlet portion 104 for receiving fuel at one end, and a nozzle body 106 depending from the opposite end of feed atm 102 for issuing atomized fuel into the combustion chamber of a gas turbine engine. A mounting flange 108 is provided proximate to inlet portion 104 for securing fuel injector 100 to the casing of a gas turbine engine. Fuel feed arm 102 includes fuel conduits to convey fuel from main fuel circuit 112, primary pilot fuel circuit 116, and secondary pilot fuel circuit 118 for atomization and combustion, as indicated in FIG. 2. As shown in FIG. 1, inlet portion 104 of injector 100 includes three fuel inlets 103, one for each of the three fuel circuits just mentioned. Fuel external to the injector is supplied to the three fuel circuits via the three respective inlets of inlet portion 104, from which it is conducted through conduits in feed arm 102, and is issued out of nozzle body 106 into combustor 10.

Referring now to FIG. 2, nozzle body 106 defines a central axis 110 and includes a main fuel circuit 112. An air circuit 114 is formed within nozzle body 106 inboard of main fuel circuit 112. As shown in the enlarged view of the pilot section in FIG. 3, nozzle body 106 also includes portions of primary pilot fuel circuit 116 and a secondary pilot fuel circuit 118 inboard of air circuit 114 and outboard of primary inner pilot air circuit 170, as will be described in greater detail below.

With continued reference to FIG. 2, the components of nozzle body 106 defining the above-mentioned air and fuel circuits therein will be described starting from the outer components and generally working inward toward axis 110. The radially outer portion of nozzle body 106 includes an outer air cap 120 and an outer air swirler 122 inboard of outer air cap 120. An outer air circuit 124, is defined between air cap 120 and outer air swirler 122, which includes swirl vanes for issuing swirled air outboard of a fuel spray issued from main fuel circuit 112. A main prefilmer 126 is inboard of and generally concentric with air cap 120 and outer air swirler 122. A main fuel swirler 128 is provided inboard of main prefilmer 126. Main fuel swirler 128 and main prefilmer 126 define a portion of main fuel circuit 112 therebetween. Main fuel swirler 128 and prefilmer 126 define a generally annular prefilming atomizer that is concentric with central axis 110, and is a diverging prefilming air-blast atomizer.

A heat shield 130 is disposed inboard of fuel swirler 128 to help thermally isolate fuel within main fuel circuit 112 and thereby reduce or eliminate coking therein. Main air swirler 132 is provided inboard of heat shield 130 and fuel swirler 128. Main air swirler 132 includes turning vanes similar to those of outer air swirler 122 for issuing a swirling flow of air inboard of fuel sprayed from the prefilming chamber of main fuel circuit 112. The downstream portion of main air swirler 132 is conical and diverges with respect to axis 110 to direct air flowing through main air circuit 114 in a diverging direction toward fuel issuing from main fuel circuit 112.

An intermediate air swirler 134 is provided radially inward from main air swirler 132, with an intermediate air circuit 136, shown in FIG. 2, defined therebetween. Intermediate air circuit 136 provides a film of cooling air along the downstream diverging inner surface of main air swirler 132 to shield the surface from thermal damage and distress. Intermediate air swirler 134 and the diverging portion of air swirler 132 are optional. Those skilled in the art will readily appreciate that in appropriate applications, main air circuit 114 can be straight instead of diverging, for example.

An inward portion of intermediate air swirler 134 includes an outer pilot air swirler 138 with turning vanes in pilot air circuit 140. Inboard of outer pilot air swirler 138 is pilot nozzle body, namely pilot atomizer 142. The downstream portion of intermediate air swirler 134 converges toward axis 110 to direct air from pilot air circuit 140 inward toward fuel issuing from pilot atomizer 142 through primary and/or secondary pilot fuel circuits 116 and 118.

Figure 3:
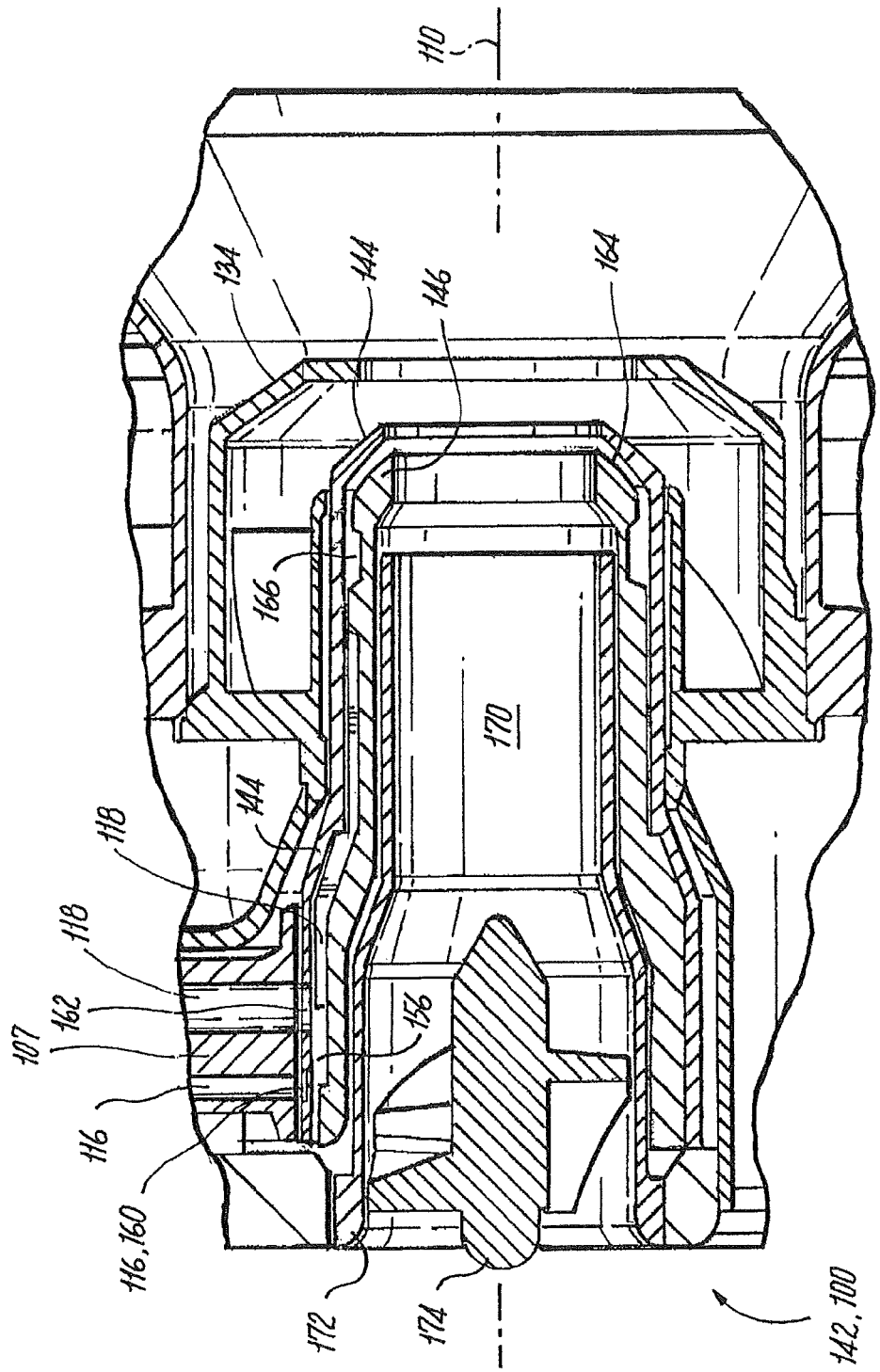
FIG. 3 is a cross-sectional side elevation view of a portion of the injector of FIG. 1, showing the radial conduits for the primary and secondary pilot fuel circuits lined up with the respective fuel circuit portions in the pilot prefilmer and pilot fuel swirler.

With reference now to FIG. 3, pilot atomizer 142 serves as a prefilming injector nozzle for pilot fuel circuits 116 and 118. Pilot atomizer includes prefilmer 144 inboard of outer pilot air swirler 138. Pilot fuel swirler 146 is mounted inboard of prefilmer 144 and fuel circuitry for pilot fuel circuits 116 and 118 is formed in channels in a cylindrical region between prefilmer 144 and swirler 146. Fuel in the respective fuel circuits passes from feed arm 102 to pilot atomizer 142 through nozzle body member 107.

As shown in FIGS. 2 and 3, pilot atomizer 142 includes inner pilot air circuit 170 defined by an inner heat shield 172 inboard of swirler 146 aligned with axis 110. An inner air swirler 174 is provided within inner pilot air circuit 170. Inner air swirler 174 is configured and adapted to impart swirl on a flow of air therethrough in a second swirl direction.

Figure 4:
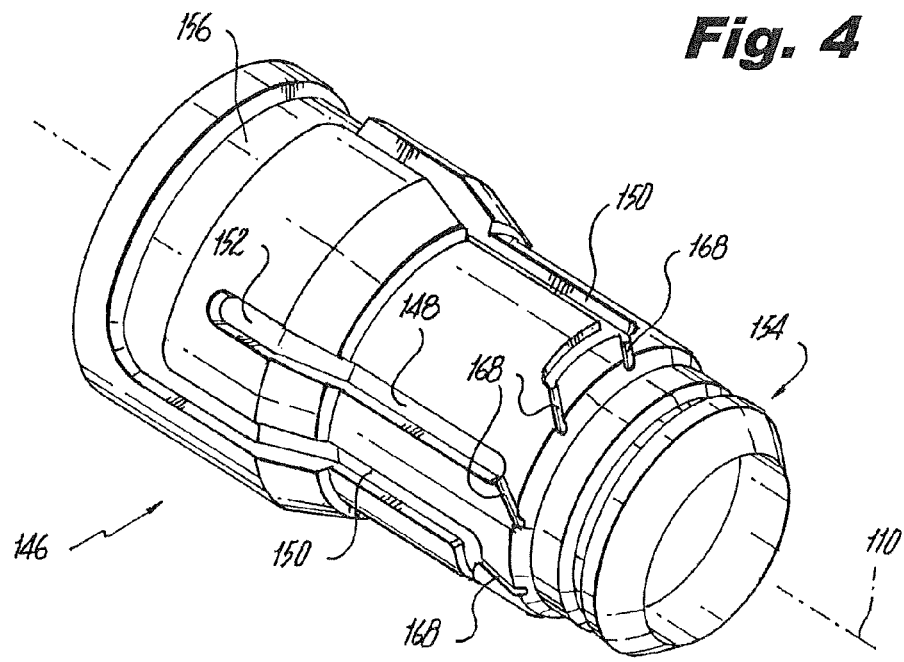
FIG. 4 is a perspective view of the fuel swirler of FIG. 3, showing the portions of the primary and secondary pilot fuel circuits defined therein.

Referring now to FIG. 4, swirler 146 provides passages for two separate fuel circuits, namely primary and secondary pilot fuel circuits 116 and 118. The first fuel circuit, namely primary pilot fuel circuit 116, includes a plurality of first fuel passages 148 defined on the outer diametrical surface of fuel swirler 146. In FIG. 4, only one fuel passage 148 is visible, but see FIG. 7 described below. The second fuel circuit, namely secondary pilot fuel circuit 118, includes a plurality of second fuel passages 150 defined on the radially outward surface of fuel swirler 146. Each of the first fuel passages 148 includes a separate first fuel inlet 152 and is in fluid communication with outlet 154 of swirler 146. Each of the second fuel passages 150 extends between outlet 154 and a common fuel inlet 156. While fuel passages 148 and 150 have their respective longitudinal axes aligned parallel with axis 110 of nozzle body 106, those skilled in the art will readily appreciate that they can be angled around axis 110 without departing from the scope of the invention. Angled fuel passages could provide enhanced fuel swirl, for example.

One of the second fuel passages 150 extends between each circumferentially adjacent pair of first fuel passages 148 making a circumferential pattern in which every other passage is a first passage 148 and every other passage is a second passage 150. However, this configuration is optional and those skilled in the art will readily appreciate that any circumferential ordering of the fuel passages around swirler 146 can be used without departing from the spirit and scope of the invention.

Figure 5:
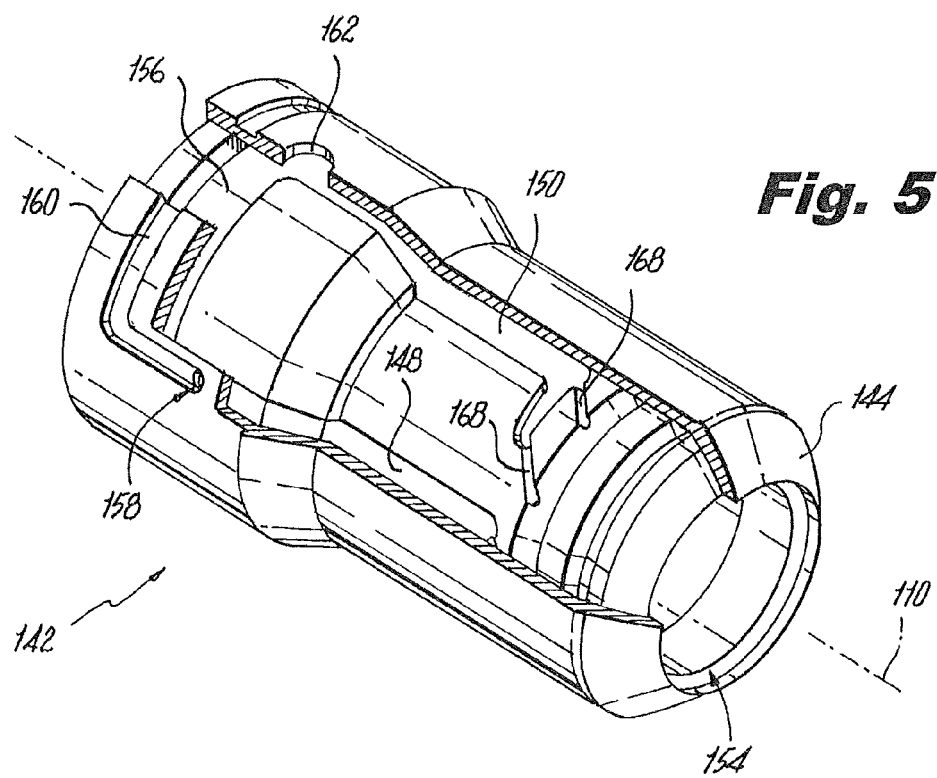
FIG. 5 is a partially cut away perspective view of the pilot prefilmer and fuel swirler of FIG. 3, showing the alignment of the fuel circuitry defined in the prefilmer with that of the fuel swirler.
Figure 6:
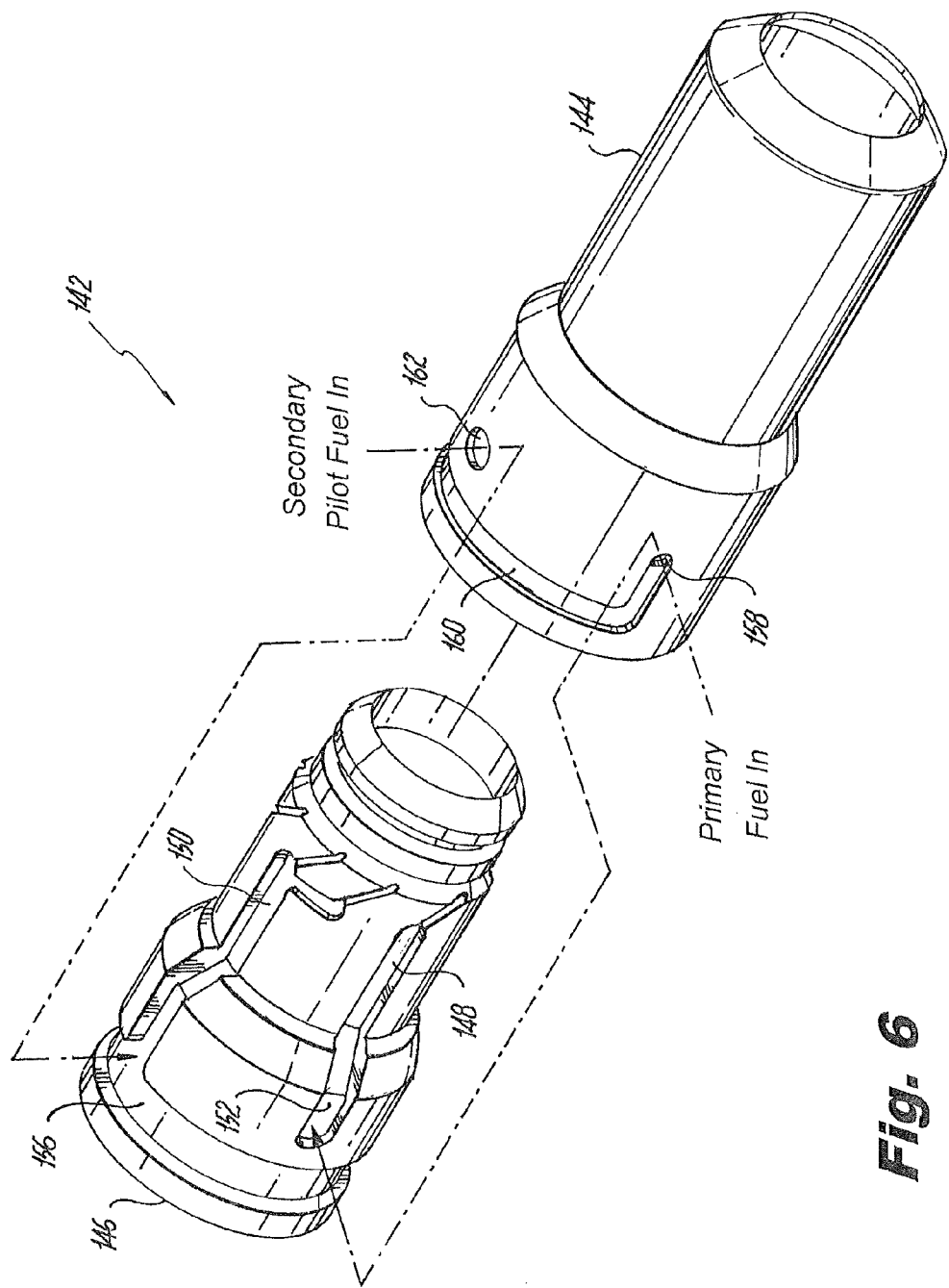
FIG. 6 is an exploded perspective view of the pilot prefilmer and fuel swirler of FIG. 5, schematically showing the fluid communication between fuel circuitry defined in the prefilmer and that of the fuel swirler.

Referring now to FIG. 5, fuel swirler 146 is shown mounted within prefilmer 144, with prefilmer 144 shown partially cutaway. Prefilmer 144 includes a set of first openings 158 therethrough for supplying fuel from primary pilot fuel circuit 116 of feed arm 102 into fuel passages 148 of pilot atomizer 142. Each of the first openings 158 corresponds to a single first inlet 152 of one of the first fuel passages 148. Openings 158 are in fluid communication with a common channel 160 in the outboard surface of swirler 146. A second opening 162 is defined through the wall of prefilmer 144 to allow fuel to enter common inlet 156 to feed the second fuel passages 150. FIG. 3 shows how fuel in the respective fuel circuits 116 and 118 in nozzle body member 107 can feed into channel 160 and second opening 162, respectively. FIG. 6 shows schematically how fuel from channel 160 fees through first openings 158 into inlets 152, and how fuel from second opening 162 feeds into common inlet 156.

While the fuel passages of the first and second fuel circuits 116 and 118 are shown as being defined on the outer diametrical surface of fuel swirler 146, the fuel passages could also be defined at least in part on the radially inner surface of prefilmer 144, or any other suitable configuration so as to be between swirler 146 and prefilmer 144.

Prefilmer 144 includes a converging exit portion that forms a swirl chamber 166 and a prefilming exit chamber 164, identified in FIG. 3, with the outlet 154 of swirler 146. Both fuel circuits are connected to supply fuel into common swirl chamber 166 and prefilming chamber 164. Swirling fuel exiting pilot atomizer 142 is directed radially inward as it passes through prefilming chamber 164. Those skilled in the art will appreciate that while prefilmer 144 converges toward the fuel exit, any other suitable nozzle exit configuration can be used without departing from the spirit and scope of the invention.

With reference again to FIG. 4, each of the first and second fuel passages 148/150 is in fluid communication with fuel outlet 154 of pilot atomizer 142 through one or more metering slots 168. Metering slots 168 are arranged circumferentially around fuel swirler 146. Each metering slot 168 is configured and adapted to impart swirl to a stream of fuel flowing therethrough in a swirl direction by being angled with respect to central axis A. Each metering slot 168 can be angled on the same angle, for example 45°, with respect to central axis 110. While all of the metering slots 168 are depicted as having the same swirl angel with respect to axis A, it is also possible for some of the slots 168 to have a different angle than others of the slots 168, as described in further detail below.

Figure 7:
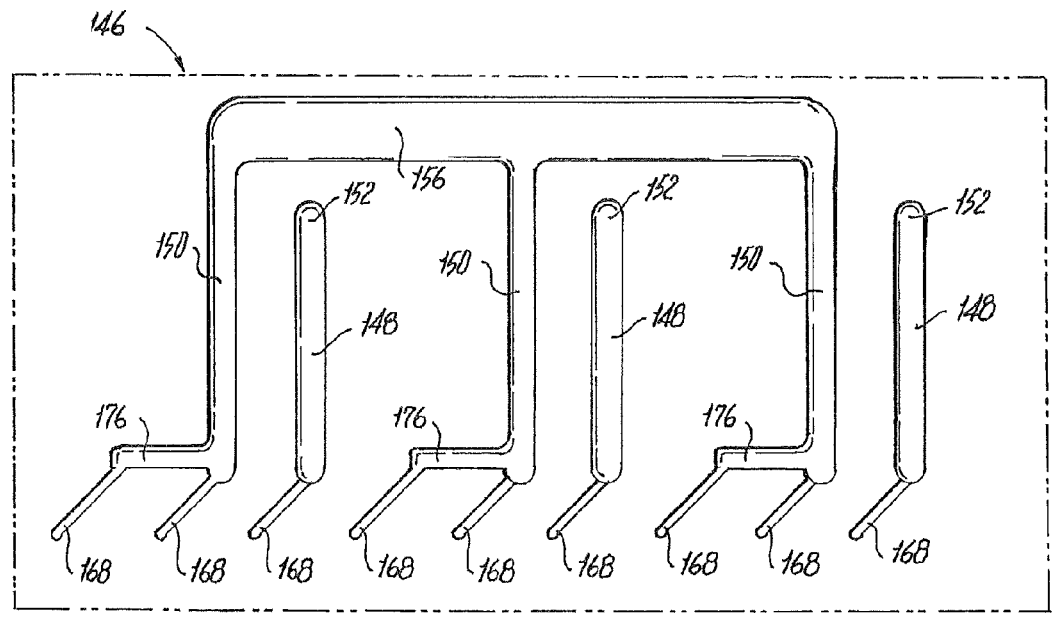
FIG. 7 is a schematic flattened view of the fuel circuitry of the pilot fuel swirler of FIG. 4, showing the alignment of the swirl slots.

Referring now to FIG. 7, first and second fuel passages 148 and 150 of pilot atomizer 142 are shown schematically, as though flattened out from their cylindrical form. As indicated in FIG. 7, there are three first fuel passages 148 and three second fuel passages 150. Those skilled in the art will readily appreciate that any suitable numbers of first and second fuel passages can be used without departing from the spirit and scope of the invention.

The primary pilot fuel circuit 116 can be configured and adapted to have a lower flow number than the secondary pilot fuel circuit 118. Slots 168 are shown having identical configurations for both first passages 148 and second passages 150, however it is also possible for slots 168 of first passages 148 to have characteristics different from slots 168 of second passages 150, or for slots 168 to have different characteristics from one another within a single fuel circuit. The number, size, angle, depth, flow number, and spacing of slots 168 for first passages 148 can be tailored to meet starting requirements for a given engine design through engine test stand tests or other suitable methods. As shown in FIG. 7, each of the first fuel passages 148 is in fluid communication with the prefilming chamber through one metering slot 168, and each of the second fuel passages is in fluid communication with the prefilming chamber through two metering slots 168 via a respective circumferential channel segment 176. This gives secondary pilot fuel circuit 118 a higher flow number than primary pilot fuel circuit 116.

Figure 8:
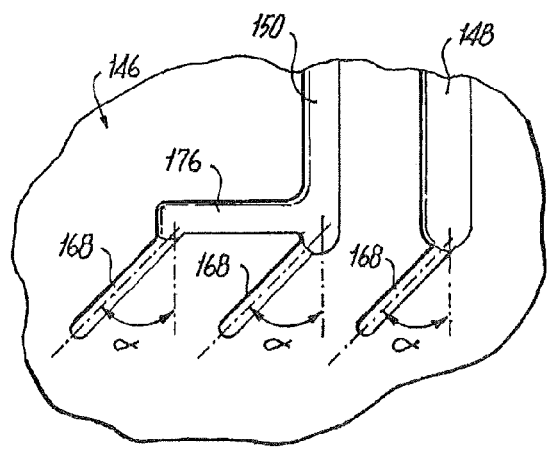
FIG. 8 is a schematic plan view of a portion of the pilot fuel swirler of FIG. 7, showing the parallel swirl slots of the primary and secondary pilot fuel circuits.
Figure 9:
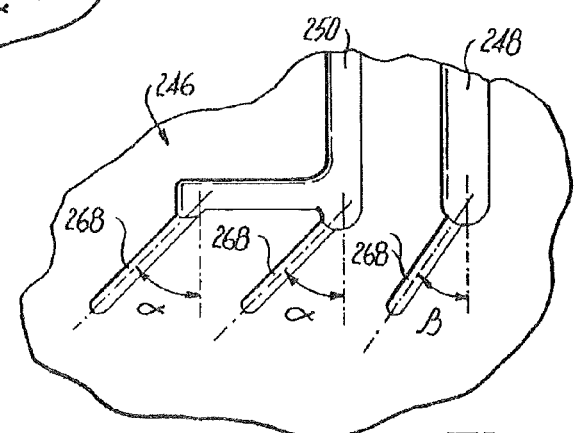
FIG. 9 is a schematic plan view of a portion of another exemplary embodiment of a fuel swirler, showing the swirl slot for the primary pilot fuel circuit at a different angle from the swirl slots of the secondary pilot fuel circuit.

Referring now to FIGS. 8-9, other circuit to circuit variations in metering slot characteristics are described. In FIG. 8, three metering slots 168 are shown, one for first fuel passage 148 and two for second fuel passage 150. Than angle α between the longitudinal axis of each metering slot 168 and the longitudinal axis its respective fuel passage 148 and 150 is the same for all the metering slots 168. However, as shown in the exemplary fuel swirler embodiment of FIG. 9, it is also possible for metering slots 268 of first fuel passages 248 to be angled at an angle β that is different from the angle α of metering slots 268 of the second fuel passages 250. Other exemplary ways to vary the metering slot characteristics from one fuel circuit to another is for each metering slot of the first fuel passages to have a first flow area, where each metering slot of the second fuel passages has a second flow area that is different from the first flow area. This can be done, for example, by having the metering slots of the two circuits be formed at two different respective channel depths and/or widths relative to the central axis of the swirler.

Having two circuits where the metering slot characteristics vary can provide flow patternation control over fuel spray from pilot atomizer 142. The spray pattern can be controlled by varying the relative flow in the first and second fuel circuits 116 and 118. For example, while it may be desirable to operate injector 100 at lean fuel to air ratios over most of the power range, it may be helpful for ignition if pilot fuel circuit 116 has a locally rich flow pattern at low power levels. If the angle of metering slots 168 in primary pilot fuel circuit 116 is relatively straight, the fuel spray will be streaky, with local rich concentrations of fuel. At higher power levels, this streakiness in the spray pattern can be diminished and eliminated as the fuel flow increases, especially when secondary pilot fuel circuit 118 issues fuel through its metering slots which have a relatively high slot angle. The fuel from these two circuits mixes in spin chamber 166, negating the streaking tendency of metering slots 168 of primary pilot fuel circuit 116. Similar control can be achieved varying slot sizes as described above.

In short, by biasing a portion of the metering slots that are fueled separately from the remainder of the metering slots, rich streaks can be created which enhance combustion stability. At higher flow rates, where emissions and component stresses are important, a more uniform fuel spray can be presented by higher power swirl slots that are fueled separately from the low power slots, which can remain flowing or can be shut down at higher power levels. This configuration can be applied in place of any traditional single circuit airblast injector, or to any injector that utilizes a prefilmer for one of the delivery means.

Metering slots 168 can advantageously be dimensioned to perform fuel pressure atomization on fuel flowing therethrough. This is advantageous during engine start up when air pressures are insufficient to fully atomize fuel from the first fuel circuit. If metering slots 168 in pilot fuel circuit 116 are configured for fuel pressure atomization, the atomizing pressure should be low enough, e.g. around 20-30 psi which can vary from application to application, to allow for a simple check valve to properly operate to regulate initial flow. If the pressure required for pressure atomization is too high for proper functioning of a suitable check valve, the start circuit need not employ pressure atomization, but can rather be configured to minimize flow area enough to provide fast moving fuel that tends to atomize rather than drooling from pilot atomizer 142. Those skilled in the art will readily appreciate that slots 168 can be, but are not required to be, configured for use in pressure atomization with out departing from the spirit and scope of the invention.

Having main, primary pilot, and secondary pilot fuel circuits 112, 116, and 118 allows the primary pilot fuel flow to be broken down into a relatively small flow number, aiding in ignition, weak stability and low power emission. It also allows the secondary pilot fuel flow to have a comparatively large flow number allowing for higher power operation while not causing requirements for severely high fuel delivery pressures. This provides for operation of a gas turbine engine up to 50%-70% or greater throttle level without activating main fuel circuit 112, while allowing for lower fuel delivery pressure requirements compared to conventional pilot stages operating at similar levels. Staging can be accomplished with check valves and/or individual manifolding for each circuit. The two-circuit atomizer configuration can also be applied to the main atomizer to split the main fuel circuit, which would also lower the requirements of fuel delivery pressure.

Breaking the pilot into multiple circuits also allows for rumble mitigation, turn-down ratio, and uniformity solution. Rumble mitigation is possible through varying the fuel splits between the two pilot circuits, or by varying the ratio of pilot to main fuel flow splits. The two circuit pilot allows for maintaining relatively high manifold supply pressures, limiting the variability circumferentially due to head effect and manufacturing variability. Ratios between two different modes of metering swirl slots can also act to provide rumble mitigation by presenting incoherent fuel distributions.

Thermal management of the three fuel circuits in injectors 100, 200 can be accomplished by cooling with fuel flowing through at least the primary pilot fuel circuit during low power engine operation to cool the other two fuel circuits when they are inactive. In general, in the feed arm 102 the primary pilot fuel circuit 116 should be outboard of the other two fuel circuits 112 and 118 and can be kept in close proximity with the other two fuel circuits 112 and 118 within the nozzle body 106, respectively. Such thermal management techniques are disclosed in commonly assigned U.S. Pat. No. 7,506,510, which is incorporated by reference herein in its entirety. The ordering of the fuel circuits described herein is exemplary and those skilled in the art will readily appreciate that the fuel circuits can be reordered as appropriate for specific applications without departing from the spirit and scope of the invention. Injector 100 also has superior properties, including the advantages of airblast atomization in both of the pilot fuel circuits 116 and 118.

The devices and methods described above provide the advantages of traditional pure airblast injector air/fuel mixtures and spray characteristics while reducing or eliminating complications of engine start up caused by traditional pure airblast injectors including fuel drooling, incomplete atomization, fuel pooling, and other related problems. Moreover, those skilled in the art will readily appreciate that the nozzles and injectors of the present invention can be configured to have the same external dimensions and configurations as existing pure airblast fuel injectors and nozzles. This allows for injectors and nozzles of the present invention to be interchangeable with existing pure airblast injectors and nozzles without the need for significant modifications to existing combustors or other engine components. While it is possible to use the injectors and nozzles of the present invention in place of and in much the same manner as traditional single stage injectors and nozzles, those skilled in the art will readily appreciate the improved functionality provided by multiple stages.

The methods and systems of the present invention, as described above and shown in the drawings, provide for air blast fuel injectors with superior properties including improved atomization and spray patternation at low flow rates, such as during engine start up. This improved atomization leads to improved emissions and operability. Moreover, the injectors and nozzles described herein provide for improved light-around and pattern factor without costly upgrades to nozzles, fuel circuits, or fuel controls of existing or newly manufactured engines. The fuel injectors described above also have superior staged operation, with a pilot only mode extending over a substantial portion of the operating power range. This is accomplished while having lower requirements of fuel delivery pressure and reducing the chance of carbon formation due to thermal breakdown of fuel.

While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A fuel injector for a gas turbine engine comprising:
   a main nozzle body defining a central axis and having a main fuel circuit; and
   a pilot nozzle body mounted inboard of the main nozzle body, the pilot nozzle body including a pilot air circuit on the central axis with fuel circuitry radially outboard of the pilot air circuit for delivering fuel to a prefilming chamber outboard of the pilot air circuit, the fuel circuitry including
   a primary pilot fuel circuit configured and adapted to deliver a fuel flow into the prefilming chamber with a first set of flow characteristics, and
   a secondary pilot fuel circuit configured and adapted to deliver a fuel flow into the prefilming chamber with a second set of flow characteristics that is different from the first set of flow characteristics for fuel patternation control by varying relative flow in the primary and secondary pilot fuel circuits.

2. A fuel injector as recited in claim 1, wherein the primary pilot fuel circuit includes a plurality of first fuel passages, and wherein the secondary pilot fuel circuit includes a plurality of second fuel passages, wherein the first and second fuel passages extend from an upstream portion of the pilot nozzle body to the prefilming chamber thereof.

3. A fuel injector as recited in claim 1, wherein the primary pilot fuel circuit is configured and adapted to have a lower flow number than the secondary pilot fuel circuit.

4. A fuel injector as recited in claim 1, wherein the primary pilot fuel circuit includes a plurality of first fuel passages, and wherein the secondary pilot fuel circuit includes a plurality of second fuel passages, wherein the first and second fuel passages extend from an upstream portion of the pilot nozzle body to the prefilming chamber thereof, wherein the first and second fuel passages are in fluid communication with the prefilming chamber by way of a plurality of metering slots, and wherein the number of metering slots of the first fuel passages is different from the number of metering slots of the second fuel passages.

5. A fuel injector as recited in claim 1, wherein the primary pilot fuel circuit includes a plurality of first fuel passages, and wherein the secondary pilot fuel circuit includes a plurality of second fuel passages, wherein the first and second fuel passages extend from an upstream portion of the pilot nozzle body to the prefilming chamber thereof, wherein the first and second fuel passages are in fluid communication with the prefilming chamber by way of a plurality of metering slots, wherein each metering slot of the first fuel passages is angled at a first angle with respect to a central axis of the pilot nozzle body, wherein each metering slot of the second fuel passages is angled at a second angle with respect to a central axis that is different from the first angle.

6. A fuel injector as recited in claim 1, wherein the primary pilot fuel circuit includes a plurality of first fuel passages, and wherein the secondary pilot fuel circuit includes a plurality of second fuel passages, wherein the first and second fuel passages extend from an upstream portion of the pilot nozzle body to the prefilming chamber thereof, wherein the first and second fuel passages are in fluid communication with the prefilming chamber by way of a plurality of metering slots, wherein each metering slot of the first fuel passages has a first flow area, and wherein each metering slot of the second fuel passages has a second flow area that is different from the first flow area.

7. A fuel injector for a gas turbine engine comprising:
   a main nozzle body defining a central axis and having a main fuel circuit; and
   a pilot nozzle body mounted inboard of the main nozzle body, the pilot nozzle body including a pilot air circuit on the central axis with fuel circuitry radially outboard of the pilot air circuit for delivering fuel to a fuel outlet in a downstream portion of the pilot nozzle body,
   the fuel circuitry including a primary pilot fuel circuit configured and adapted to deliver fuel to the fuel outlet and a secondary pilot fuel circuit configured and adapted to deliver fuel to the same fuel outlet via a common prefilming chamber defined in the downstream portion of the pilot nozzle body upstream of the fuel outlet.

8. The fuel injector as recited in claim 7, wherein the primary pilot fuel circuit includes a plurality of first fuel passages, and wherein the secondary pilot fuel circuit includes a plurality of second fuel passages, wherein the first and second fuel passages extend from an upstream portion of the pilot nozzle body to the fuel outlet thereof.

9. The fuel injector as recited in claim 8, wherein the first and second fuel passages feed into the common prefilming chamber.

10. The fuel injector as recited in claim 8, wherein the pilot nozzle body includes a fuel swirler outboard of the pilot air circuit and a wherein the prefilmer is mounted outboard of the fuel swirler, wherein the first and second fuel passages are defined in an outboard surface of the fuel swirler, and wherein each of the first fuel passages includes a first fuel inlet in fluid communication with a first opening through the prefilmer, and wherein each of the first fuel passages includes a metering slot in fluid communication with the fuel outlet of the pilot nozzle body.

11. The fuel injector as recited in claim 8, wherein the pilot nozzle body includes a fuel swirler outboard of the pilot air circuit and wherein the prefilmer is mounted outboard of the fuel swirler, wherein the first and second fuel passages are defined in an outboard surface of the fuel swirler, and wherein each of the second fuel passages extends between the outlet of the pilot nozzle body and a common fuel inlet in fluid communication with a second opening through the prefilmer.

12. The fuel injector as recited in claim 8, wherein one of the second fuel passages extends between each circumferentially adjacent pair of first fuel passages.

13. The fuel injector as recited in claim 7, wherein the primary pilot fuel circuit is configured and adapted to have a lower flow number than the secondary pilot fuel circuit.

14. A fuel injector as recited in claim 7, wherein at least one of the main fuel circuit and pilot fuel circuits includes a diverging prefilming air-blast atomizer.

15. A fuel injector for a gas turbine engine comprising:
a nozzle body including an air circuit on a central axis of the nozzle body with fuel circuitry radially outboard of the air circuit for delivering fuel to a prefilming chamber outboard of the air circuit, the fuel circuitry including:
a first fuel circuit configured and adapted to deliver a fuel flow into the prefilming chamber with a first set of flow characteristics, and
a second fuel circuit configured and adapted to deliver a fuel flow into the prefilming chamber with a second set of flow characteristics that is different from the first set of flow characteristics for fuel patternation control by varying relative flow in the first and second fuel circuits; and
wherein the first fuel circuit of the nozzle body includes a plurality of first fuel passages, and wherein the second fuel circuit of the nozzle body includes a plurality of second fuel passages, wherein the first and second fuel passages extend from an upstream portion of the nozzle body to the prefilming chamber thereof, wherein the first and second fuel passages are in fluid communication with the prefilming chamber by way of a plurality of metering slots and
wherein a number of metering slots of the first passages and a number of metering slots of the second fuel passages have relative to one another a different number of metering slots, a different angle with respect to the central axis of the nozzle body, or a different flow area.

16. The fuel injector as recited in claim 15, wherein the number of metering slots of the first fuel passages is different from the number of metering slots of the second fuel passages.

17. The fuel injector as recited in claim 16, wherein each of the first fuel passages is in fluid communication with the prefilming chamber through one metering slot, and wherein each of the second fuel passages is in fluid communication with the prefilming chamber through two metering slots.

18. The fuel injector as recited in claim 15, wherein each metering slot of the first fuel passages is angled at a first angle with respect to the central axis of the nozzle body for imparting swirl onto fuel flowing therethrough, wherein each metering slot of the second fuel passages is angled at a second angle with respect to the central axis that is different from the first angle.

19. The fuel injector as recited in claim 15, wherein each metering slot of the first fuel passages has a first flow area, and wherein each metering slot of the second fuel passages has a second flow area that is different from the first flow area.

20. The fuel injector as recited in claim 19, wherein each metering slot of the first fuel passages has a first depth relative to the central axis, and wherein each metering slot of the second fuel passages has a second depth relative to the central axis that is different from the first depth.

* * * * *